(12) United States Patent
Francis et al.

(10) Patent No.: US 8,775,628 B2
(45) Date of Patent: Jul. 8, 2014

(54) LOAD BALANCING FOR SIP SERVICES

(75) Inventors: Philip Lee Francis, Plano, TX (US);
David Allan Collins, Garland, TX (US);
Gerald Richard Dubois, Dallas, TX
(US); James Lynn Bunch, Dallas, TX
(US); Naga Ratnam Pokala, Southlake,
TX (US)

(73) Assignee: Metaswitch Networks Ltd., Enfield
(GB)

( * ) Notice: Subject to any disclaimer, the term of this patent is extended or adjusted under 35 U.S.C. 154(b) by 144 days.

(21) Appl. No.: 13/222,267

(22) Filed: Aug. 31, 2011

(65) Prior Publication Data

US 2013/0054806 A1 Feb. 28, 2013

(51) Int. Cl.
*G06F 15/173* (2006.01)

(52) U.S. Cl.
USPC .......................................... 709/226; 709/224

(58) Field of Classification Search
USPC ................................. 709/203, 223–229, 201
See application file for complete search history.

(56) References Cited

U.S. PATENT DOCUMENTS

| | | | | |
|---|---|---|---|---|
| 7,583,657 | B1 * | 9/2009 | Webster et al. | 370/352 |
| 7,805,517 | B2 * | 9/2010 | Shim et al. | 709/227 |
| 8,417,817 | B1 * | 4/2013 | Jacobs | 709/226 |
| 2003/0235168 | A1 | 12/2003 | Sharma et al. | |
| 2006/0242300 | A1 * | 10/2006 | Yumoto et al. | 709/226 |
| 2007/0121490 | A1 | 5/2007 | Iwakawa et al. | |
| 2008/0086567 | A1 | 4/2008 | Langen et al. | |
| 2008/0155310 | A1 | 6/2008 | Langen et al. | |
| 2008/0228926 | A1 * | 9/2008 | Shiratzky et al. | 709/228 |
| 2008/0275943 | A1 * | 11/2008 | Grayson et al. | 709/203 |
| 2009/0271515 | A1 * | 10/2009 | Iyengar et al. | 709/226 |
| 2010/0030880 | A1 * | 2/2010 | Joshi et al. | 709/223 |
| 2010/0088412 | A1 * | 4/2010 | Deval et al. | 709/226 |
| 2010/0128861 | A1 * | 5/2010 | Vendrow et al. | 379/114.01 |
| 2011/0276679 | A1 * | 11/2011 | Newton et al. | 709/224 |
| 2012/0036273 | A1 * | 2/2012 | Badger | 709/227 |
| 2012/0102182 | A1 * | 4/2012 | Voskuil et al. | 709/223 |
| 2012/0233248 | A1 * | 9/2012 | Zou et al. | 709/203 |
| 2013/0007505 | A1 * | 1/2013 | Spear | 714/4.11 |

FOREIGN PATENT DOCUMENTS

| | | | | |
|---|---|---|---|---|
| EP | 2063600 A1 | 5/2009 | | |
| WO | WO2011/063718 | * | 6/2011 | H04L 12/54 |

* cited by examiner

*Primary Examiner* — Joshua Joo
(74) *Attorney, Agent, or Firm* — EIP US LLP

(57) ABSTRACT

Methods of operating an SIP load balancer, one or more SIP server nodes and/or one or more SIP server instances are provided that efficiently manage a processing load. Configurations for an SIP load balancer, one or more SIP server nodes and/or one or more SIP server instances to enable efficient management of a processing load are also described. In certain ones of these, state data for a set of SIP processes may be sent from a SIP server instance and used by a SIP load balancer to remove inactive SIP processes from a data structure. The management of a processing load comprising a number of SIP processes following the failure of a SIP server node and/or a SIP server instance is also provided.

16 Claims, 7 Drawing Sheets

LOAD BALANCING FOR SIP SERVICES

FIELD OF THE INVENTION

The present invention relates to processing load balancing. In particular, the present invention relates to the balancing of a processing load including a number of SIP processes.

BACKGROUND OF THE INVENTION

The Session Initiation Protocol (SIP) is a standardized signaling protocol for controlling communication sessions over a network. It enables sessions with one or more participants to be created, modified and/or terminated and it is widely used to control multimedia communications over Internet Protocol (IP) networks. For example, it can be used to control Voice over IP (VoIP) communications, instant messaging, chat, games and video communications between multiple entities, supporting both unicast and multicast sessions. It is also used as a signaling protocol in 3rd Generation Partnership Project (3GPP) standards such as the IP Multimedia Subsystem (IMS) architecture.

SIP is an application layer protocol and as such is designed to be used independently of underlying transport protocols. Its syntax is text-based and is modeled on that of HyperText Transfer Protocol (HTTP). One or more SIP services are typically provided by a SIP server instance. A SIP server instance is used herein to refer to an entity that receives and processing SIP messages so as to provide a SIP service. A SIP server instance is typically implemented using computer program code that is loaded from a storage medium into one or more portions of memory so as to be processed by one or more processors. The computing platform that provides said one or more processors and/or memory is referred to herein as a SIP server node. Examples of SIP server instances comprise OpenSIPS for Linux platforms, Microsoft Lync Server provided by Microsoft Corporation, and those provided by the DC-SIP toolkit provided by Data Connection Limited. An exemplary SIP server node may comprise a SPARC server platform such as those supplied by Oracle Corporation. In some implementations the SIP server instance and the SIP server node may be tightly coupled in an integrated "blackbox" device ("a SIP server"), wherein some aspects of the SIP server instance may be implemented using dedicated hardware of the SIP server node. In other implementations, the SIP server instance and the SIP server node may be separable. The combination of one or more SIP server instances and a SIP server node is generally referred to herein as a SIP server.

SIP messages comprise either a request or a response. A SIP transaction comprises a request that is sent to a SIP server node over a communications channel and that invokes a particular method or function on the SIP server instance. This method or function then results in a response which is sent by the SIP server node over a communications channel in reply to the request. SIP server instances may provide a number of different SIP services. For example, amongst others, provide a logical end-point, provide proxy services, provide redirect services, provide registration services, and/or provide gateway services. As such, the combination of one or more SIP server instances and a SIP server node may implement physical devices such as proxy servers, redirect servers, registration servers, media gateways and session border controllers.

User agents create and/or receive SIP messages. User agents may be software-based, for example a so-called "softphone" operating on a personal computer, or may comprise an embedded system forming part of a hardware device such as an IP phone. Proxy servers are typically used to route SIP requests from a first user agent to, for example, a second user agent. Redirect and registration servers support user mobility. Session border controllers control signaling between two networks. SIP servers may be coupled to a Plain Old Telephone Service (POTS) using a media gateway.

SIP messages may comprise headers and values, all specified as strings. The body of a SIP message may contain a description of a session, for example using a format specified by the Session Description Protocol (SDP). Encryption may also be used, which is referred to as SIPS.

A large scale communications system may manage thousands, if not millions, of communication sessions, for example VoIP calls, multimedia conversations or gaming sessions. Each of these sessions may comprise one or more SIP transactions or SIP "dialogs", e.g. an on-going exchange of messages between two devices registered to two corresponding users. To cope with this level of SIP traffic a plurality of SIP server instances and/or SIP server nodes are typically required. A SIP server instance has a limitation on the number of SIP messages it can process per time period. This is typically based on underlying physical limitations of a SIP server node that is implementing the SIP server instance. To avoid overloading any one particular SIP server instance and/or SIP server node a load balancer is required. A load balancer has the function of distributing a processing load associated with the SIP traffic across a plurality of SIP server instances. If a first SIP server instance is near capacity, a load balancer can assign new SIP transactions or dialogs to a second SIP server instance with more capacity. SIP load balancers are thus used to provide SIP clients, such as user agents, with a centralized point of access for a scalable network of server instances supporting SIP services, known in the art as a cluster. A SIP load balancer may provide mechanisms to dynamically distribute SIP messages across SIP server instances in order to optimize the collective traffic handling capabilities of the cluster. In some cases they may additionally provide for improved availability of the SIP services provided by the SIP server instances.

SIP server instances, such as SIP proxy instances, may be "stateful" or "stateless". In these cases the "state" may relate to a transaction, a dialog or a call. A transaction, a dialog or a call can be thought of as a SIP process, i.e. any process that uses the SIP protocol. Stateless systems do not maintain a record of the state of a transaction, dialog or call when processing the transaction, dialog or call. For example, a stateless SIP proxy instance would create no SIP transaction state data when forwarding a request. This results in retransmitted requests being indistinguishable from new requests and thus processed again to produce identical results to a first set of request processing. In comparison, stateful systems maintain, or keep track of, the state of a transaction, dialog or call. For example, a call-stateful SIP proxy instance may store or otherwise remember successful SIP INVITE messages relating to a call, keeping track of any dialogs that are created until the call and any dialogs are terminated with a SIP BYE message. Transaction-stateful proxy instances may generate state information while handling each SIP request, waiting for responses, and handling the responses that arrive so as to, amongst other tasks, recognize transmissions or failure conditions. The Internet Engineering Task Force (IETF) standards document RFC3261 sets out details of stateful SIP systems.

Most SIP load balancers are designed to operate in a generic environment with little or no knowledge of the proxy instances they are distributing traffic to. While these load balancers are suited to distribute SIP traffic to stateless SIP server instances, they can lead to a number of problems when there is a requirement to distribute traffic to stateful SIP server instances. For example, when distributing traffic to stateful SIP server instances, it is necessary to ensure that all messages for a SIP process are routed to the same SIP server node, and the same SIP server instance operating on that SIP server node, for processing. This is because the SIP server instance maintains state information relating to the process; if SIP messages were sent to another SIP server instance it would not have the required state information to suitably process the messages.

One solution to ensure that all messages for a SIP process are routed to the same SIP server instance is to store routing information at the SIP load balancer that correlates a SIP process with a serving SIP server instance. In certain examples, this is achieved using a mapping between a SIP process identifier, such as a call or transaction identifier, and the serving SIP server instance, for example a (virtual) IP address assigned to a SIP server node implementing the SIP server instance. For example, one known system provides a number of node servers that include a storage portion for storing node-session information that associates a SIP or HTTP session ID and a server node. However, if routing information is used then the SIP load balancer must maintain data associated with this information.

In many SIP server cluster arrangements it is typically found that the SIP load balancer becomes the limiting factor with regard to scalability. For example, additional SIP server instances and/or SIP server nodes can be added to increase capacity, but additional SIP load balancers cannot be added without losing the benefits of a centralized point of access. There is thus a problem of increasing scalability for high volume SIP services, such as those provided by cluster architectures. This is compounded when using stateful SIP server instances as a requirement to maintain state information adds processing overheads.

SUMMARY OF THE INVENTION

In accordance with a first exemplary embodiment, there is provided a method for balancing a processing load between a plurality of SIP server instances, a SIP server instance being mapped to a SIP process by a load balancer such that messages relating to the SIP process are passed between a communicating device and the SIP server instance, a SIP server instance actively processing in use a number of SIP processes, the method comprising: maintaining, at the load balancer, a data structure mapping one or more SIP processes to a SIP server instance from the plurality of SIP server instances; receiving, at the load balancer, state data for a set of SIP processes from the SIP server instance, the state data indicating one or more states of said SIP processes on the SIP server instance; and updating, at the load balancer, the data structure based on the received state data, including using said state data to remove SIP processes from the data structure that have an inactive state.

In accordance with a second exemplary embodiment, there is provided an apparatus for balancing a processing load between a plurality of SIP server instances, a SIP server instance actively processing a number of SIP processes, the apparatus comprising: a data structure for mapping one or more SIP processes to at least one of the plurality of SIP server instances; an interface for receiving state data for a set of SIP processes from said at least one SIP server instance, the state data indicating one or more states of said SIP processes on said at least one SIP server instance; and an update manager for updating the data structure based on received state data, the update manager being arranged to use said state data to remove SIP processes from the data structure that have an inactive state.

In accordance with a third exemplary embodiment, there is provided a method for communicating with a SIP load balancer, the method being performed by a SIP server instance that is arranged to receive one or more SIP messages from a communicating device, the one or more SIP messages forming part of a SIP process assigned to the SIP server instance by the SIP load balancer, the method comprising: determining whether a SIP processing update is required; if a SIP processing update is required, generating state data for a set of SIP processes, the state data indicating one or more states of SIP processes being processed by the SIP server instance; and sending said state data to the SIP load balancer.

In accordance with a fourth exemplary embodiment, there is provided an apparatus for handling SIP messages comprising: a first interface for receiving one or more SIP messages from a communicating device; a processing component arranged to handle said received messages as part of a SIP process; a second interface for sending state data for a set SIP processes to a load balancer, the state data indicating a state of said SIP processes on said apparatus.

In accordance with a fifth exemplary embodiment, there is provided a system for balancing a SIP processing load comprising a plurality of server nodes and a load balancer, wherein the plurality of server nodes collectively comprise: a first SIP server instance arranged to handle one or more SIP processes during normal operation; and a second SIP server instance arranged to act as a standby server instance during normal operation, the second SIP server instance being arranged to take over the handling of said one or more SIP processes responsive to failure of the first SIP server instance, and wherein the load balancer is arranged to assign a SIP process to a SIP server instance, and wherein, responsive to a second SIP server instance taking over the handling of one of more SIP processes previously handled by a first SIP server instance, the load balancer is arranged to assign new SIP processes to a group of SIP server instances that excludes said second SIP server instance.

In accordance with a sixth exemplary embodiment, there is provided a system for balancing a SIP processing load comprising: a SIP server instance arranged to handle one or more SIP processes, said SIP server instance arranged to provide a single load factor value representative of its current resource usage; and a load balancer comprising: an interface for receiving said load factor value from said SIP server instance; a loading calculator to determine a first countdown value for the SIP server based on the load factor value, the first countdown value being decremented when a new SIP server is assigned to the SIP server; and a load assigner for assigning a SIP process to the SIP server according to a round-robin scheme if said first countdown value is above a predetermined threshold.

In accordance with a seventh embodiment, there is provided a method for balancing a processing load comprising: assigning a SIP process to an active primary SIP proxy instance; on failure of the primary SIP proxy instance, activating said SIP process on a standby secondary SIP proxy instance, said secondary SIP proxy instance becoming an active secondary SIP proxy instance following said activation; recovering the failed primary SIP proxy instance, said primary SIP proxy instance becoming a standby primary SIP proxy instance on recovery, SIP processes on the active secondary SIP proxy instance being synchronised to the standby primary SIP proxy instance; and after a configurable time period has elapsed, activating SIP processes on the standby primary SIP proxy, such that the primary SIP proxy becomes the active primary SIP proxy and the secondary SIP proxy becomes the standby secondary SIP proxy.

Further features and advantages of the invention will become apparent from the following description of preferred embodiments of the invention, given by way of example only, which is made with reference to the accompanying drawings.

DETAILED DESCRIPTION

Figure 1:
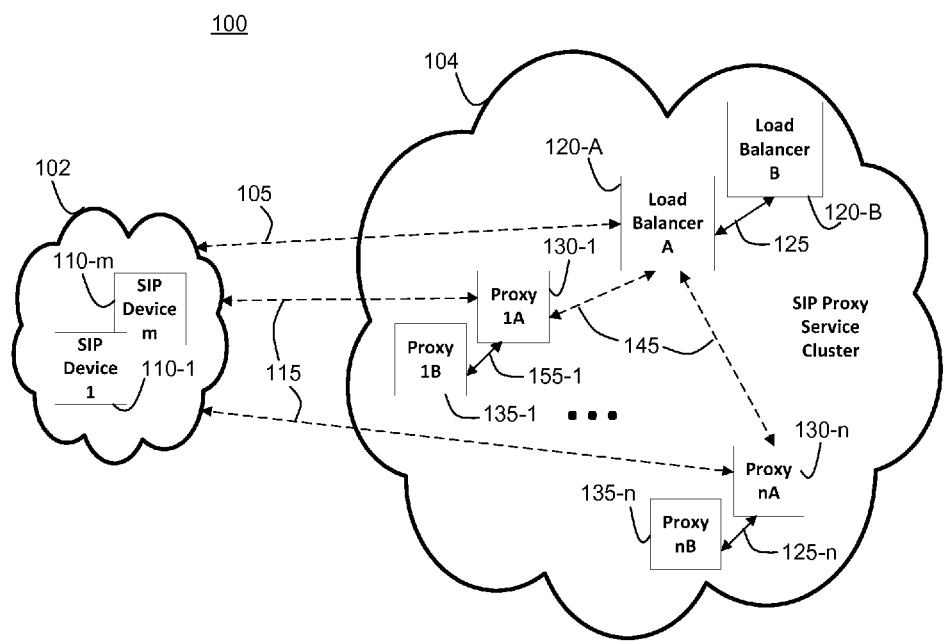
FIG. 1 is a schematic illustration of a comparative SIP proxy service cluster.

Certain embodiments enable a SIP load balancer to efficiently manage multiple stateful SIP proxy server instances with minimal header parsing and minimal state tracking at the SIP load balancer. Certain embodiments also avoid the need for header manipulation, for example SIP messages relating to the SIP process are passed between a communicating device and the SIP server instance, implemented on a SIP node server, without modification by the load balancer.

In some embodiments a step of receiving state data for a set of SIP processes comprises receiving, at the load balancer, a periodic notification of state data for a set of SIP processes from the SIP server instance, the state data for a set of SIP processes in a notification indicating SIP processes that the SIP server instance has completed since a previous notification. This enables the data structure of a SIP load balancer to be periodically updated to remove completed calls and avoid memory overload problems.

In some embodiments a method comprises requesting, by the load balancer, state data identifying active SIP processes from the SIP server instance; and receiving, at the load balancer, a response from said SIP server instance comprising said state data. These mechanisms enable state and routing information for SIP processes to be efficiently managed with minimal processing overheads. For example, they may allow state synchronization between SIP load balancers to be avoided during normal operation, as a SIP load balancer may simply request required state data from one or more SIP server instances following a switch-over. This means a SIP load balancer has more capacity to act as a centralized service and can be scaled more easily.

In certain embodiments, the state data identifying a set of known active SIP processes comprises state data identifying a set of SIP processes for which the load balancer has not received a corresponding message for a configurable time period. The method may also comprise sending, from the load balancer, said state data identifying a set of known active SIP processes for the SIP server instance from the data structure and receiving, at the load balancer, a response from said SIP server instance comprising a subset of said set indicating SIP processes that are no longer active. This enables information relating to "hung" or "lost" calls to be removed from a data structure in a SIP load balancer so as to avoid memory problems. For example, the response of the SIP server instance allows "hung" or "lost" calls to be removed from the data structure in the SIP load balancer. The response indicates the subset of calls from the request call set that are no longer active (the latter call set indicating "long hold time" calls). This may act as a safety net to prevent a SIP server node from running out of available memory space.

In some embodiments the state data comprises one or more process identifiers for a set of SIP processes that have a common state. This reduces the data needed to be sent between SIP proxy instances and the SIP load balancer. It also simplifies the parsing and processing of the state data.

Corresponding modifications to apparatus for load balancing and apparatus for SIP processing are also envisaged.

In certain embodiments, the load balancer is arranged to assign new SIP processes to a group of SIP server instances that excludes a secondary SIP server instance. This effectively reduces the impact of a spike in SIP traffic experienced by a SIP server node comprising a secondary SIP proxy instance when a SIP proxy instance fails. It provides a mechanism to initiate the balancing of new transactions and/or calls immediately after detection of a failed primary SIP proxy instance. It also minimizes SIP traffic disruption during recovery of a SIP proxy instance following a fault.

In some embodiments, the system has a desired system capacity and wherein a server has an absolute server capacity within which it can maintain normal operation, the number of server nodes being calculated based on M=(desired system capacity/absolute server capacity)+1. An "N+1" architecture for a SIP stateful proxy service cluster reduces hardware cost by using a reduced number of proxy server nodes for proxy redundancy.

In some embodiments, the load balancer is arranged to control whether a SIP process is assigned to a SIP server instance based on an operational capacity, the operational capacity based on desired system capacity * (1/M), wherein a SIP process is not assigned to a SIP server instance if assignment of the SIP process would cause the number of operations performed by said server instance and/or the SIP server node to exceed the operational capacity. The operation capacity acts to de-rate an absolute server capacity and thus prevent server instance and/or node overload when multiple proxy server instances are hosted on a proxy server node.

In some embodiments, responsive to a recovery of a primary SIP server instance after a failure, a primary SIP server instance is arranged to take over the handling of one of more SIP processes from the secondary SIP server instance after recovery of said primary SIP server instance.

In some embodiments, the primary SIP server instance is implemented on a first server node and the secondary SIP server instance is implemented on a second server node. This means that failure of the proxy server node implementing the primary SIP server instance does not affect the operation of the secondary SIP server instance.

In some embodiments, a server instance is arranged to provide a single load factor value representative of its current resource usage, for example usage relating to the server instance or the hosting server node, and the load balancer comprises an interface for receiving said load factor value from said server instance, a loading calculator to determine a first countdown value for the server instance based on the load factor value, the first countdown value being decremented when a new SIP process is assigned to the server instance, and a load assigner for assigning a SIP process to the server instance according to a round-robin scheme if said first countdown value is above a predetermined threshold. This provides a simple yet effective way to distribute SIP traffic equally to SIP proxy server instances. The use of a single load factor value enables efficient load balancing and overload control based upon multiple performance criteria associated with the proxy services.

In some embodiments, the loading calculator is arranged to determine a second countdown value for the SIP server instance responsive to the first countdown value being below and/or equal to the predetermined threshold and countdown values for one or more SIP server instances managed by the load balancer being below and/or equal to the predetermined threshold. The load balancer may be arranged to use one or more load factor values to determine whether to accept new SIP processes for assignment. Various combinations of the above example are envisaged, as discussed further below.

FIG. 1 shows a comparative example that may be used to better explain certain embodiments of the present invention. This example shows a redundant configuration 100 for a typical SIP proxy service cluster that may be accessed by a plurality of SIP devices. FIG. 1 shows a group 102 of "m" SIP devices 110. This group 102 may comprise a number of SIP devices connected to one or more homogeneous or heterogeneous networks. For example, it may comprise a number of SIP devices 110 coupled to one or more Internet Protocol (IP) networks (e.g. the "Internet"). The SIP devices 110 may comprise SIP user agents such as software-based "softphones" operating on personal or mobile computers, or may comprise an embedded system forming part of a hardware device such as an IP phone.

The group 102 of SIP devices 110 communicate with a SIP proxy service cluster 104 using communication channels 105 and 115. The SIP proxy server cluster 104 comprises a pair of SIP load balancers 120: an active SIP load balancer 120-A and a standby SIP load balancer 120-B. SIP load balancers, such as those shown in FIG. 1, are typically implemented as stand-alone units. FIG. 1 also shows a plurality of SIP server nodes 130. Each SIP server node 130 hosts, i.e. implements, a corresponding SIP server instance (not shown). By adding more SIP server nodes to the cluster 104, each SIP server node hosting a corresponding SIP server instance, capacity can be scaled.

In normal operation active SIP load balancer 120-A distributes SIP traffic, i.e. SIP messages, to "N" pairs of SIP proxy instances hosted by SIP server nodes 130 over communication channels 145. Typically, new SIP transactions or dialogs are first received by the active SIP load balancer 120-A using communication channel 105. For example, the SIP devices 110 or other SIP proxies coupled to said devices may be configured to send all SIP messages that begin a new transaction or dialog to a particular IP address, that IP address being mapped to the active SIP load balancer 120-A. This SIP load balancer 120-A acts as a centralized point of access to a scalable network of server nodes in the form of server nodes 130. On receipt of these SIP messages that begin a new transaction or dialog, the active SIP load balancer 120-A assigns the transaction or dialog to one of the SIP server nodes 130. Future messages relating to the same SIP process will then be forwarded by the SIP load balancer 120-A to a SIP server node 130 hosting the SIP server instance to which the SIP process has been assigned. The messages are typically sent via communication channels 145. The SIP proxy instance then responds to the SIP devices 110 via communications channel 115 or via the active SIP load balancer 120-A, the latter requiring communication channels 145 and 105. Communication channels 115 may also be used to send a message from a SIP proxy instance that terminates a call. As SIP is an application protocol, communication channels 105, 115 and 145 may comprise any communication channel suitable for transporting SIP messages; the lower level transport, internet and link layer protocols may be selected as appropriate for a particular implementation. Each communications channel may comprise one or more wired or wireless communications links coupled to suitable hardware on the SIP server nodes.

The SIP proxy instances and the SIP devices 110 communicate with the active SIP load balancer of the pair 120 via a virtual IP address. This address is moved between the two load balancers 120 in the case of a fault. For example, if the active load balancer 120-A in FIG. 1 was to develop a fault, the standby SIP load balancer 120-B would take over, and the virtual IP address would be transferred from the active SIP load balancer 120-A to the standby SIP load balancer 120-B. In FIG. 1, a proprietary communication channel 125 exists between the SIP load balancers 120 for synchronizing proxy routing information and transaction or dialog state information between active and standby instances. In FIG. 1, each SIP server node 130 forms part of a node pair together with SIP server nodes 135; in normal operation, SIP server nodes 135 act as standby nodes. A virtual IP address for communication is assigned to the server node hosting the active SIP proxy instance and a proprietary channel 155 exists between the two SIP server nodes for synchronizing state information relating to active transactions and/or dialogs, i.e. in normal operation the standby SIP server node maintains redundant state information. All communication between the active load balancer, active proxy instances, and external SIP devices is based upon standard SIP messaging as illustrated by the dashed lines in FIG. 1.

The comparative example of FIG. 1 presents a number of problems. Some of these are described below.

SIP processes are typically transient; they may relate to a time-limited transaction or call. Most VoIP calls last an average of a few minutes. A SIP load balancer may assign tens of thousands of calls a second. Over a prolonged period of time, without maintenance, any data structure storing routing information at a SIP load balancer would become large in size and complex. If the data structure is stored in memory there may be a risk of running out of space in memory, which could impair the performance of the load balancer or cause it to stop functioning.

Certain SIP load balancers require that all SIP messages pass through the load balancer to keep a track of active SIP processes. For example, a SIP load balancer may require a "Via" header field in any SIP message sent to a SIP server node hosting a SIP server instance to identify the load balancer. This routes any SIP messages sent as responses through the SIP load balancer. Additionally, some SIP load balancer implementations manipulate "Record-Route" and "Route" headers to ensure subsequent SIP requests pass through the load balancer. If the SIP load balancer has access to SIP messages it can then monitor the SIP traffic to determine when a SIP process is complete. Once a SIP process is complete it can be removed from the data structure.

Keeping track of SIP messages in this way, so as to manage routing information, leads to numerous problems. Firstly, monitoring SIP traffic increases the complexity of the SIP load balancer. Secondly, in the case of stateful SIP traffic, solutions such as those discussed above require the load balancer to perform many of the same functions that the SIP server instances perform. For example, it must parse and manipulate multiple headers within the SIP message to ensure the SIP load balancer remains in the SIP message path. It must also track messages and keep state information in a similar manner to a SIP server instance. For example, it is important not to remove SIP server instance and/or SIP server node routing information prematurely, as this may result in dropped calls and generally poor service. A SIP load balancer must therefore be aware of and track many different SIP message flow scenarios, including many different failure modes, in order to determine when it is safe to remove routing data. This work is for the most part very similar to that which is already being performed by the proxy instances as part of their normal operation. Thirdly, for high availability configurations, the SIP load balancer must also synchronize this routing and state information with a backup SIP load balancer. This is necessary so the backup SIP load balancer can take over message routing responsibilities if the active SIP load balancer fails. At high traffic rates, the volume of these synchronization updates can be considerable. Fourthly, the load balancers of these solutions require that the "Via" header be removed from the SIP messages before they are forwarded to other devices. These problems typically reduce the efficiency of a SIP load balancer making it difficult to scale cluster systems wherein the SIP load balancer is a centralized point of access. For example, the SIP load balancer is less able to process an increased traffic load due to the processing overheads resulting from the need to monitor SIP messages. In redundant configurations, as routing and state information needs to be synchronized with a standby SIP load balancer, the performance of the active SIP load balancer is impaired by these solutions.

Hence, there is a need for a SIP load balancer's design to be as efficient as possible to maximize the capacity potential of a service cluster. A more efficient SIP load balancer is able to handle higher traffic volumes thus enabling a SIP cluster to scale more easily.

Certain embodiments of the present disclosure describe how integration between the SIP load balancer and SIP services can be used to reduce processing requirements for the load balancer as compared to previous implementations.

Figure 2:
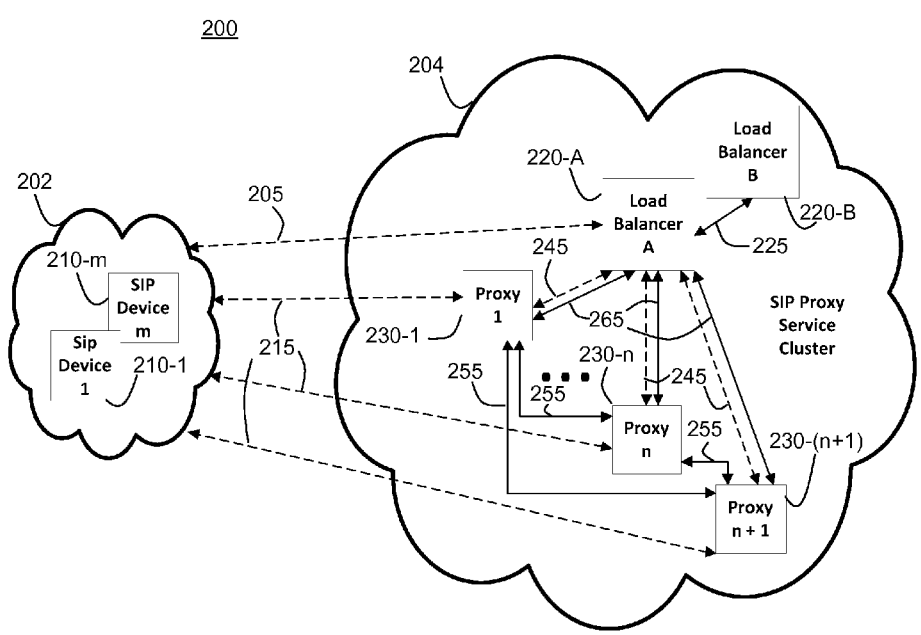
FIG. 2 is a schematic illustration of an exemplary SIP proxy service cluster that incorporates features of an embodiment of the present invention.
Figure 5:
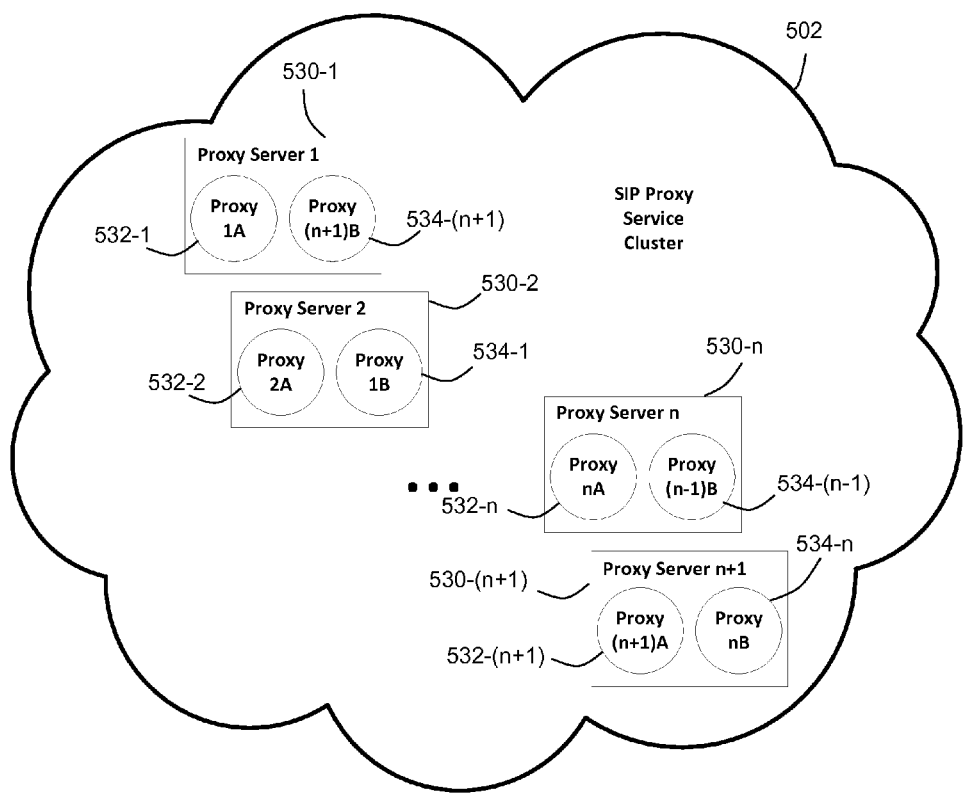
FIG. 5 is a schematic illustration of an exemplary arrangement of SIP proxy server instances according to an embodiment of the present invention.

FIG. 2 shows a redundant configuration 200 for an integrated SIP proxy service cluster 204 according to an embodiment of the present disclosure. As in FIG. 1, a group 202 of "m" SIP devices 210 communicates with a SIP Proxy Service Cluster 204. FIG. 2 shows an example wherein a processing load is balanced between a number of SIP server nodes that implement one or more SIP proxy (server) instances, however, the system may also be adapted to operate with any form of SIP server instance. In this case a pair of SIP load balancers 220 distribute SIP traffic to "N+1" SIP server nodes 230. Each SIP server node 230 may host one active primary SIP proxy instance and one standby secondary SIP proxy instance under normal operation. An exemplary arrangement of the SIP proxy instances is shown in FIG. 5 and described later below. Likewise, the SIP load balancers comprise an active SIP load balancer 220-A and a standby SIP load balancer 220-B. Similar to the configuration of FIG. 1, a virtual IP may be used for communication to the active SIP load balancer. A communication channel 225 may be provided between the active and standby load balancers; however, the arrangement of the present example means that no routing or state information need be passed over this communication channel 225. Instead, the communication channel 225 may only be used for health monitoring, for example to exchange heartbeat messages that indicate the operational status of each SIP load balancer. The SIP proxy instances may utilize a virtual IP for communication with the active proxy instance. If an arrangement such as that shown in FIG. 5 is used, there are circumstances wherein a SIP server node 230 may be assigned two virtual IP addresses, one for an active primary SIP proxy instance and one for an active secondary SIP proxy instance. This is described in more detail in the description of FIG. 5. In FIG. 2 there are one or more proprietary communication channels 255 between peer instances for exchanging data that enables a redundant SIP proxy instance to be maintained. As shown by communication channels 205, 215 and 245 standard SIP messaging still exists between the active SIP load balancer 220-A, SIP server nodes 230 implementing active SIP proxy instances, and external SIP devices 210 as in the comparative example of FIG. 1. However, in contrast to the comparative example of FIG. 1, an additional sideband communication channel 265 is provided between the active SIP load balancer 220-A and the SIP server nodes 230. This may comprise a physical communication channel, such as a wired or wireless link, or a virtual communication channel, for example a connection set up over a common physical link. In some embodiments, both the SIP messaging communication channel 245 and the sideband communication channel 265 may comprise different transport level connections set up over a common IP channel. The sideband communications channel 265 may comprise a proprietary connection.

Figure 3:
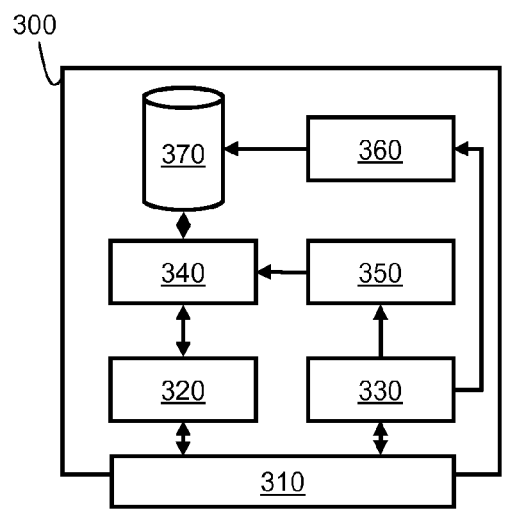
FIG. 3 is a schematic illustration of an exemplary SIP load balancer according to an embodiment of the present invention.

FIG. 3 is a schematic diagram of an exemplary SIP load balancer 300 that may be used as one or more of SIP load balancers 220 in FIG. 2. The SIP load balancer 300 may comprise a computer server with one or more processors and memory. Alternatively, it may comprise a dedicated hardware device. Components 310 to 370 may be implemented by hardware such as dedicated or programmable integrated circuits, software such as modules implemented in a known programming language such as Java, C, or C++, computer program code for the modules being stored in memory and processed in operation by one or more processors, or a combination of software and hardware.

SIP load balancer 300 comprises a communications interface 310. Communications interface 310 may comprise a network interface arranged to send and/or receive messages over one or more physical wired or wireless communication links. It may comprise two or more separate interfaces if two separate physical links are used for the SIP messaging communication channel 245 and the sideband communication channel 265 or if a common physical link is used a single communications interface may be provided that passes SIP messages and sideband communications to two respective higher level interfaces. For example, the communications interface 310 may perform link and/or IP (i.e. Internet) level processing before passing higher level messages, such as transport layer messages over User Datagram Protocol (UDP) or Transport Control Protocol (TCP) or application level messages, to higher level interfaces.

In the example of FIG. 3 there is provided a SIP interface 320 and sideband interface 330. SIP interface 320 is arranged to send and/or receive SIP messages to a communicating device such as a SIP server node 230 or a SIP device 210. SIP interface 320 is coupled to a load assignor 340. The load assignor 340 is arranged to assign a SIP process to a SIP proxy instance hosted by one of SIP server nodes 230. The load assignor 340 is coupled to a data structure 370 that stores a mapping between a SIP process identifier and a SIP proxy instance. For example, a SIP message may be received by the communications interface 310 of SIP load balancer 300 and be passed to the SIP interface 320. The SIP interface 320 may determine that the SIP message initiates a new SIP transaction, dialog or call (i.e. a new SIP process) and alert the load assignor 340 to assign the new SIP process to a SIP proxy instance. For example, it may be determined by the load assignor 340 that an identifier contained within a SIP header field of the message, such as a Call-ID as defined by the SIP protocol, cannot be found within the data structure 370 and as such the message must be a new message. The load assignor 340 then selects a suitable SIP proxy instance. This may be achieved using a load calculator 350 that in turn may use performance and/or loading information received from the sideband interface 330. Examples of load assignment methods are described in more detail with reference to FIG. 9. Selecting a suitable SIP proxy instance involves mapping an identifier for the SIP process, which may be a Call-ID as defined by the SIP protocol, to the SIP proxy instance, which may be identified by the virtual IP address assigned to an active SIP proxy instance in a two-instance pair. For example, data structure 370 may comprise a table such as that set out below:

| Call-ID | Serving Proxy Instance |
|---|---|
| a84b4c76e66710@pc33.example.com | 170.15.252.4 |
| 54ebg1c6ce30aa@pc11.example2.com | 170.15.252.109 |
| ... | ... |

In this example, the SIP proxy instances are on a common network, however, distributed cluster architectures are also possible wherein SIP proxy instances are hosted by SIP server nodes on different networks. Using the above example, on receipt of a further message, the load assignor 340 is arranged to parse the Call-ID header field of the SIP message, or receive this field from the SIP interface 320. It then looks up the data structure 370, which may be indexed by Call-ID, to determine an IP address of a serving SIP proxy instance. The SIP message is then forwarded to the IP address of the serving SIP proxy instance, the serving SIP proxy instance being hosted by one of the SIP server nodes 230. Utilizing a map data structure indexed by Call-ID, such as that set out above, provides an efficient solution for the routing of SIP messages by a SIP load balancer. It minimizes the additional processing overheads required to route traffic to stateful SIP proxy instances.

The SIP load balancer 300 of FIG. 3 also comprises an update manager 360. Update manager 360 is responsible for managing data structure 370; in particular for removing entries relating to completed SIP processes. The update manager 360 receives information relating to active SIP processes present in data structure 370 from the sideband interface 330. This information is originally received by the communications interface 310 from the SIP proxy instances, as hosted by SIP server nodes 230 or 400 via a sideband communications channel, such as channel 265. The information is used to remove entries from the data structure 370 relating to completed SIP processes. This process is described in more detail below with reference to FIGS. 4, 6 and 7.

Figure 4:
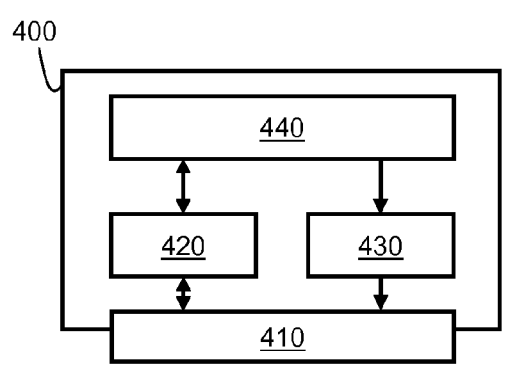
FIG. 4 is a schematic illustration of components comprising an exemplary SIP proxy instance according to an embodiment of the present invention.

FIG. 4 shows an exemplary SIP server node 400. The SIP server node 400 may comprise a SIP proxy instance, i.e. a control program operating on a computer. Like the SIP load balancer, the components described herein may be implemented in hardware, software and/or a combination of both hardware and software. For ease of explanation components 420 to 440 are deemed to form the SIP proxy instance. In other embodiments the SIP proxy instance may comprise SIP processor 440 and any of components 410 to 430. In a similar manner to SIP load balancer 300, SIP server node 400 also comprises a communications interface 410. This may be implemented by a software interface interacting with a physical network interface of a computer. A software portion of the communications interface 410 may also form part of the SIP proxy instance, a hardware portion of the communications interface 410 forming part of the SIP server node 400. Also like SIP load balancer 300, a SIP proxy instance comprises a SIP interface 420 and a sideband interface 430. SIP interface 420 is arranged to receive, parse and/or partially process SIP messages received by the SIP node server 400 from the communications interface 410. These messages typically originate from SIP devices 210 but may be forwarded by the SIP load balancer 220/400. The SIP messages and/or parsed data from the messages are passed to a SIP processor 440. SIP processor 440 may be implemented by processing computer program code on one or more physical computer processing units (CPU) of the SIP server node 400 that interact with one or more memory stores of SIP server node 400. SIP processor 440 performs the SIP proxy functions, for example, forwarding SIP requests to one or more destinations and arranging transport of SIP messages between two SIP devices 210 so as to provide voice, text or multimedia communications. SIP processor 440 maintains SIP state data relating to SIP processes, for example, it may keep a record of previous SIP messages relating to a particular on-going transaction, dialog or call. SIP processor 440 comprises internal data structures (not shown) that enable it to manage state information for a SIP process. When a SIP process completes, SIP processor 440 is arranged to remove and/or archive the associated state data. In the present example these internal mechanisms are augmented so that an identifier for the completed SIP process, such as a Call-ID, is added to state data indicating completed SIP processes. For example, garbage or clean-up handling routines forming part of the computer program code implementing SIP processor 440 may be amended to add a Call-ID for a completed transaction, dialog or call to a list structure. The SIP processor 440 and/or the sideband interface 430 is then arranged to send this state data via the sideband interface 430 and communications interface 410 to the SIP load balancer 220/400 at periodic intervals, for example at intervals determined by a timer component or handler. This state data, for example a list of Call-IDs for completed calls, is subsequently received via the communications interface 310 and sideband interface 330 of the SIP load balancer 300. It is then used by the update manager 360 to remove completed calls from the SIP load balancer's data structure 370.

This embodiment requires minimal modification to existing stateful SIP proxy instances. It also adds minimal processing overheads. The SIP proxy instances typically already comprise mechanisms to manage their own internal data structures; the present embodiment uses these mechanisms to supply data to the SIP load balancer 300. This avoids duplicated effort at the SIP load balancer 300. Moreover, since the SIP load balancer 300 is informed by the SIP proxy instances using the SIP node servers 400 when to remove routing information related to completed call, there is no need to track SIP process state to determine this at the SIP load balancer 300. As the SIP proxies 400 periodically notify the SIP load balancer 300 of completed calls there is also no need for the SIP load balancer to stay within the message flow for a SIP process, for example through "Via" or "Route" header fields. A benefit of this approach is that only a single header field need be parsed at the SIP load balancer and there is no need to manipulate any of the header fields in the SIP message. For example, as there is no need to insert or remove a "Via" SIP header field, each SIP message can be forwarded by the SIP load balancer unchanged.

Figure 6:
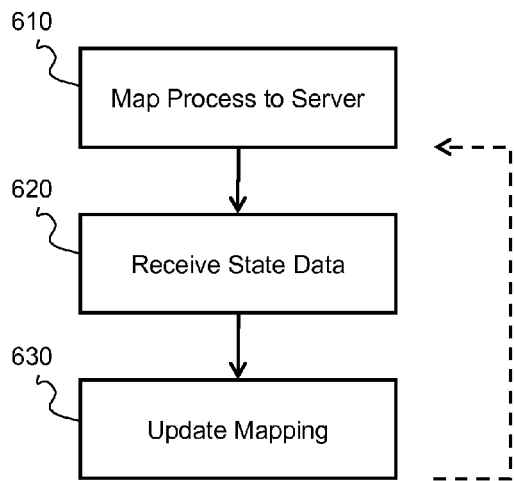
FIG. 6 is a flow diagram illustrating an exemplary method of managing a SIP load balancer according to an embodiment of the present invention.

FIG. 6 shows an exemplary method for managing SIP processes at a SIP load balancer. The method of FIG. 6 may be implemented by the SIP load balancer 220 or 300 of FIGS. 2 and 3. At step 610, a SIP process is mapped or assigned to a SIP server instance. The SIP server instance may be a SIP proxy instance such as an instance hosted by SIP server nodes 230 or 400. The mapping is typically recorded in a data structure. At step 620, state data is received from one or more SIP server instances. This state data may be sent by SIP-server-node hardware and the state data may be received over sideband communications channel 265. A set of one or more operations may be performed that result in state data being received. In a first operation, the state data may be received based on a periodic notification event. For example, a SIP proxy instance may comprise a timer wherein a list of Call-IDs for SIP processes that have completed are periodically sent from a SIP server node. These Call-IDs may indicate SIP processes that have completed since a previous notification event. In a second operation, a request/response mechanism is defined where a SIP load balancer can request state data for all active SIP processes on a SIP server instance. For example, a SIP load balancer may send a request for a list of Call-IDs of all SIP processes that are being actively processed by a SIP server instance. These identifiers may be returned over one or more (e.g. possibly multiple) responses from the SIP server node hosting the SIP server instance. In a third operation, a request/response mechanism is defined wherein the SIP load balancer sends a number of identifiers for a set of SIP processes to a SIP server instance. The SIP server instance then replies with state data for the set of SIP processes. For example, a SIP load balancer may send a list of Call-IDs for SIP processes known to have been active on a SIP server instance for a particular length of time. These may be so-called "long duration" calls: calls that have been active for a predetermined number of minutes (e.g. 10 minutes). In this example, the SIP server instance receives the request from the SIP load balancer and replies with a subset of the list containing Call-IDs for those SIP processes that are no longer active on the SIP server instance. This last mechanism provides an audit mechanism for SIP processes. At step 630, the mapping modified as part of step 610 is updated based on the state data received from the SIP server instance. In the examples where a list of Call-IDs for completed calls are received, entries in a mapping data structure such as data structure 370 that have matching Call-IDs may be removed from the data structure. Where a list of active Call-IDs is returned the SIP load balancer may use these to populate an empty data structure 370 when a standby SIP load balancer transitions to an active state due to a mate fault. Instead of constantly syncing data structure 370 between the two SIP load balancers during normal operation, the SIP server instances may be queried on switchover to build up the data structure 370 on the newly active SIP load balancer based on current state of each proxy instance. The method of FIG. 6 may be repeated, for example on loop or at predetermined time intervals, as shown by the dashed line.

Figure 7:
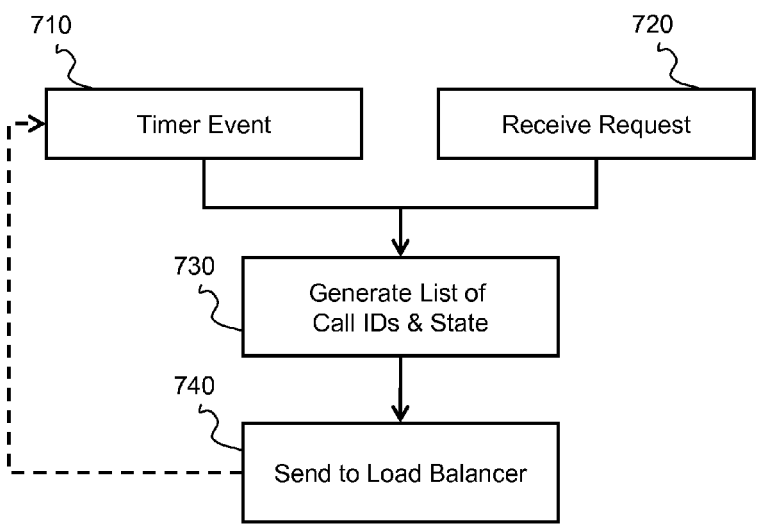
FIG. 7 is a flow diagram illustrating an exemplary method of managing a SIP proxy instance according to an embodiment of the present invention.

FIG. 7 shows an exemplary method for returning state data from a SIP server instance. The SIP server instance may be implemented upon one of the SIP server nodes 230 or 400. At steps 710 and 720, a timer event, or a request received from a SIP load balancer, initiates the method. The timer event may be produced by a timer component as part of a periodic notification operation as described above. The request may be generated as part of the second or third operations described above. At step 730, state data is generated. This may comprise a list of Call-IDs that have a particular state, e.g. a list of identifiers for completed SIP processes, or a list of identifiers and their associated state, e.g. a tuple such as "(a84b4c76e66710@pc33.example.com, ACTIVE)" or "(a84b4c76e66710@pc33.example.com, COMPLETED)". At step 740, the state data is sent to a SIP entity such as a SIP load balancer. For example, step 740 may result in state data being received at step 620 in FIG. 6. Following step 740, the SIP server instance may wait for the next timer event or request as indicated by the dashed line in FIG. 7.

In a first variation of an embodiment, the mechanisms described above may also be used to avoid the need for constant SIP load balancer synchronization. For example, in the comparative example of FIG. 1, routing and state information needs to be exchanged over communications channel 125 to synchronize standby SIP load balancer 120-B with active SIP load balancer 120-A. This requires processing resources at each SIP load balancer, impairing the ability of the active SIP load balancer 120-A to cope with high volumes of SIP traffic. However, in the presently described embodiment, a standby SIP load balancer, such as standby SIP load balancer 220-B, may be implemented using the SIP load balancer components of FIG. 3. This allows the standby SIP load balancer 220-B to query one or more of SIP proxy nodes 230 for state data from a corresponding SIP proxy instance indicating the state of SIP processes active on each active SIP proxy instance. For example, on failure of the active SIP load balancer 220-A, standby SIP load balancer 220-B can dynamically build a mapping of SIP processes to SIP server instances by querying each SIP proxy instance for a list of Call-IDs for active SIP processes. The active SIP proxy instances, using a corresponding SIP server node 230, then return this data enabling the standby SIP load balancer 220-B to build a mapping data structure such as data structure 370. Alternatively, the standby SIP load balancer 220-B may be arranged to build a mapping data structure in the manner described over a period of time while the active SIP load balancer 220-A is active. For example, in one example, each SIP proxy instance may be arranged to send notifications or responses to both the active and standby load balancers or a routing device may be adapted to copy and forward sideband communications to the active SIP load balancer 220-A and to the standby SIP load balancer 220-B.

By avoiding the need for synchronization between the SIP load balancers 220, the mechanisms described herein also avoid the problem of "lost" or "hung" routing and state information when a load balancer fails. For example, in the comparative example of FIG. 1 both active and standby SIP load balancers may have state for an active SIP process, the state data at the standby SIP load balancer being redundant in case of failure of the active SIP load balancer. If the active SIP load balancer receives a SIP message that results in a completed call and subsequent removal of state information, but subsequently fails before it has the chance to synchronize the change in state information to the standby SIP load balancer, then the standby SIP load balancer can maintain state information for a completed SIP process that it believes is not yet complete and as such that is never removed from its data structures. This can lead to subsequent memory problems. However, by using a request from the standby SIP load balancer to obtain state data from each active SIP proxy instance this problem never arises.

In a second variation of an embodiment, the "audit mechanism" of the third operation described above may be used to remedy a similar problem to that described above when state data is lost when a SIP server instance or SIP server node fails. For example, if a SIP server instance is arranged to periodically send a notification of completed SIP processes to the SIP load balancer, then if the SIP server instance fails, or if the SIP server node hosting the SIP server instance fails, before a subsequent notification, state data relating to SIP processes that have completed since the previous notification may be "lost". There is thus a risk that identifiers for completed SIP processes are maintained at the SIP load balancer. One solution to this problem is to synchronize updates to the state of SIP processes between SIP server instances. However, this typically adds an undesirable processing overhead and in certain circumstances still does not address the problem (for example, if a failure occurs before an update is synchronised). Instead, a preferred solution for the second variation is to use the "audit mechanism" of the third operation.

As described above, in the third operation a request/response mechanism is defined wherein the SIP load balancer sends a number of identifiers for a set of SIP processes to a SIP server instance. The SIP server instance then replies with state data for the set of SIP processes. In the present example, a SIP load balancer builds a list of Call-IDs, one list per (active) SIP proxy instance, for SIP processes for which it has not seen a corresponding SIP message in a configured amount of time. These lists are sent to the appropriate SIP proxy instances, which return a subset of their list containing Call-IDs for which they have no state information. These represent the "lost" or "hung" SIP processes. Upon receiving these responses the SIP load balancer simply removes routing and/or state information corresponding to each Call-ID returned in the lists. Alternatively, the SIP server instances may also respond with any Call-IDs listed by the SIP load balancer that are still active and then information relating to any Call-IDs present in the SIP load balancer's data structure(s) that are not present in the returned lists may be removed at the SIP load balancer. Either method has the same effect. By configuring the amount of time to a value where only a statistically small number of SIP processes should be present, the processing overheads required by this operation become negligible. For example, if most VoIP calls average around 3 minutes and the amount of time is set to 5 or 10 minutes, most "lost" or "hung" calls would be completed by the time a request is made. For example, depending on the mechanism(s) used, each returned list would typically comprise identifiers for a few "legitimate" long hold calls and identifiers for calls that can be considered "lost" or "hung" calls. The same methods may be applied to remove state information relating to SIP processes that are "lost" or "hung" dues to other unforeseen circumstances such as logic or communication errors. It guarantees that over time the SIP load balancer 220 and the SIP proxy instances remain in sync with regard to active SIP processes without the need for resource-intensive real-time synchronization. This presents an improvement over generic SIP load balancers, such as load balancers 120 in FIG. 1. Without this audit mechanism, there is a risk that associated state information would "hang" forever in systems such as that of FIG. 1. Repeat occurrences of such an event could eventually lead to an out of memory condition and possible failure of the SIP load balancer.

One possible arrangement for the SIP Proxy Service Cluster 204 of FIG. 2 will now be described in more detail. In some embodiments, this arrangement may be implemented without the sideband communication channel and associated operations described with regard to FIGS. 3, 4, 6 and 7. The arrangement addresses the allocation of proxy services, in the form of SIP proxy instances, to underlying SIP server nodes. While the example is directed towards the allocation of proxy services, it could equally be applied to other SIP services such as redirect services, registration services and/or gateway services.

FIG. 1 shows a SIP proxy service cluster 104 wherein SIP proxy instances are deployed in a 2N configuration. There are N SIP proxy instances that are deployed on a first set of N dedicated server nodes 130. There are then another N standby SIP proxy instances that are deployed on a second set of N dedicated server nodes 135. In total there are thus 2N dedicated server nodes and 2N proxy instances. A proxy instance may be implemented by computer program code while a server node may comprise one or more processors and a memory, i.e. computing hardware. While this arrangement allows for protected traffic capacity to be based upon the full capability of a server node, it becomes very expensive as the SIP proxy service cluster 104 is scaled up. This is because two dedicated server nodes need to be provided for each useable SIP proxy instance. In comparison, the arrangement presented herein uses an "N+1" configuration which can greatly reduce cost as the size of the proxy cluster is scaled.

FIG. 5 shows the allocation of SIP proxy instances 532, 534 to proxy server nodes 530 in an integrated SIP proxy service cluster 502. Each proxy server node 530 comprises one active primary SIP proxy instance 532 and one standby secondary SIP proxy instance 534 under normal operation. An active primary SIP proxy instance is a proxy service instance that is designed to handle SIP traffic during normal system operation. A standby secondary SIP proxy instance is a proxy service instance that is designed to back up an associated active primary SIP proxy instance during normal system operation. On failure of active primary SIP proxy instance, the standby secondary SIP proxy instance takes over the SIP processes of the primary SIP proxy instance and becomes an active secondary SIP proxy instance. The active secondary SIP proxy instance is responsible for handling SIP processes that the failed primary SIP proxy instance was responsible for prior to its failure. Typically, following failure, the primary SIP proxy instance is restarted, replaced or reset. Following recovery, a primary SIP proxy instance, or a new primary SIP proxy instance, becomes a standby primary SIP proxy instance while the active secondary SIP proxy instance is handling the SIP processes. The standby primary SIP proxy instance waits for a controlled switch-over from an active secondary SIP proxy instance, possibly triggered following a configurable time period from recovery of the primary SIP proxy instance, so the system can return to normal operation. During its time as standby primary SIP proxy instance, it may also back up the active secondary SIP proxy instance in case the latter fails prior to any switch-over. After switch-over, normal operation returns and the SIP proxy instances return to their active primary and standby secondary roles.

In a typical implementation, one virtual IP address is assigned per proxy server node 530 for communication to the active primary SIP proxy instance 532. To lessen the impact of a proxy server node failure, each proxy server node typically comprises unrelated primary and secondary SIP proxy instances. For example, in FIG. 5, a first proxy server node 530-1 comprises a first primary SIP proxy instance 532-1 and a (n+1)th secondary SIP proxy instance 534-(n+1); the secondary SIP proxy instance 534-1 associated with the first primary SIP proxy instance 532-1 is implemented by a second proxy server node 530-2. In the case of an active primary SIP proxy instance fault, a server node may be assigned two virtual IPs addresses: one for an active primary SIP proxy instance and one for an active secondary SIP proxy instance. For example, if primary SIP proxy instance 532-1 was to fail, proxy server 530-2 may hold two virtual IP addresses, one for active primary SIP proxy instance 532-2 and one for active secondary SIP proxy instance 534-1 that has taken over the SIP processes of now inactive primary SIP proxy instance 532-1. A similar allocation of virtual IP addresses would also occur for a proxy server node fault, with the additional loss of a standby secondary SIP proxy instance.

By allocating SIP proxy instances to proxy server nodes in a flexible manner, as shown in FIG. 5, it is possible to deploy SIP proxy instances that operate in a 2N mode on "N−1" fewer server nodes as the cluster is scaled.

A first variation of the arrangement of FIG. 5 will now be described. The first variation provides a method, and SIP proxy service cluster arrangement, that avoids overloading a proxy server node.

In a typical SIP proxy service cluster, such as 104 of FIG. 1, each SIP proxy server node 130 and 135 has an absolute server capacity. The absolute server capacity is typically defined in terms of operations per second that the server node can perform without overloading system resources, e.g. Y operations per second. These operations may be SIP processing operations. In alternative implementations, central processor unit (CPU) cycles, memory allocations and/or any other metric relating to operating conditions of a computer system may be used to define the absolute server capacity. The proxy service cluster as a whole also has a cluster capacity. This may also be defined in terms of operations per second and may be a function of the individual absolute server capacities of the server nodes.

When designing a SIP proxy service cluster a desired cluster capacity is typically set by a service provider. For example, a telecommunications provider may stipulate that a SIP proxy service cluster that can handle X operations per second is required. A system designer uses this desired cluster capacity to calculate the number of server nodes, M, that are required. For a 2N configuration such as that shown in FIG. 1 this is calculated as (cluster capacity/absolute server capacity)×2, i.e. $M=(X/Y)*2$. For a N+1 configuration such as that shown in FIG. 5 this is calculated as (cluster capacity/absolute server capacity)+1, i.e. $M=(X/Y)+1$. If the absolute server capacity was 1000 operations per second and a desired cluster capacity was set at 10,000 operations per second, the arrangement of FIG. 1 would require 20 server nodes and the arrangement of FIG. 5 would require 11 server nodes.

In the comparative example of FIG. 1, if a proxy server node fails then its processing load is transferred to an inactive proxy server node. However, for the arrangement of FIG. 5 the failure of a proxy server node results in extra operations being assigned to one or more already active server nodes. For example, if proxy server node 530-1 were to fail, at least the operations of the active primary SIP proxy instance 532-1 would be transferred to the standby secondary SIP proxy instance 534-1 on proxy server node 530-2. In certain cases another standby secondary SIP proxy instance would also need to be set up on one of the other proxy server nodes to take over the backup function of standby secondary SIP proxy instance 534-(n+1).

To ensure that the extra operations assigned to an already active server node do not overload the server node, the present variation acts to de-rate the absolute server capacity by setting an operational server capacity. This operational server capacity limits the number of SIP processes that are assigned to a SIP proxy instance operating on a proxy server node by a SIP load balancer. This prevents overload of an individual server node. Operational server capacity is calculated as cluster capacity×(1/number of server nodes), i.e. $X*(1/M)$. If the absolute server capacity was 1000 operations per second and a desired cluster capacity was set at 10,000 operations per second then the operational server capacity for each server node would be set at 909 operations per second. Set at this level, the cluster 502 would be able to cope with the failure of a SIP proxy server node. In certain embodiments a SIP proxy instance may reject SIP processes assigned to it by a SIP load balancer based on the operational server capacity of the SIP server node implementing the instance. The SIP load balancer would then attempt to assign the SIP process to another SIP proxy instance.

For example, the operational capacity for a load balancer system may be specified as a licensed limit. For a load balancer system with M servers and a capacity C for each server, the license limit would equal M*C for servers of equal capacity. A licensed limit may also be set based on the type of process being assigned, for example whether the process is stateless, transaction stateful, or call stateful. The load balancer tracks the overall traffic over a period of time as an aggregate for all of the server instances. The licensed limit is specified as an overall aggregate over a period of time. If the license limit is exceeded, all traffic serviced by the load balancer is terminated for a traffic limit period, i.e. new processes are no longer received and assigned by the load balancer. When the traffic limit period expires, traffic is gradually allowed to increase until all traffic is allowed, i.e. until the load balancer assigns all new processes it receives. A gradual increase in traffic is useful as it prevents SIP proxy instances being flooded with not only new traffic but also traffic resulting from retries that occurred due to the traffic termination period. This increased traffic would rapidly overwhelm the overall capacity of the proxy server nodes and instances and exhaust processing resources.

A second variation of the arrangement in FIG. 5 will now be described. The second arrangement acts to address problems associated with the failure and subsequent switch-over of a SIP server instance.

In an ideal implementation, when a SIP server instance in the cluster fails, a SIP load balancer would be able to instantly distribute SIP traffic across all remaining cluster servers. However, depending on the network hardware and channel latency of each implementation, this is not always the case. On failure of an active primary SIP proxy instance, one proxy server node within the cluster is hosting two active proxy instances: a normally-hosted active primary SIP proxy instance and an active secondary SIP proxy instance that has taken over for another failed primary SIP proxy instance on another proxy server node. If no adaptation is made, following the failure, the SIP load balancer will initially continue distributing an equal amount of SIP traffic, i.e. continue assigning an equal number of SIP processes, to all active SIP proxy instances in the service cluster. The SIP load balancer will do this until it sees a load imbalance across the service cluster caused by the fault and corrects the load distribution. This effectively leads to an initial spike in SIP traffic being seen at the proxy server node that has the two active (i.e. active primary and secondary) SIP proxy instances. In effect this proxy server node will experience twice the normal SIP traffic level.

To address this problem in the present second variation, the SIP load balancer is arranged to assign no new SIP processes to an active secondary SIP proxy instance that has taken over the operations of a failed primary SIP proxy instance. "New" SIP processes are those that are initiated following the time of the failure of the active primary SIP proxy instance. This in turn avoids new SIP traffic being sent to the active secondary SIP proxy instance. In most embodiments, the SIP load balancer is notified when one or more of the following occurs: a failover; a standby secondary SIP proxy instance becoming an active secondary SIP proxy instance; a standby primary SIP proxy instance becoming an active primary SIP proxy instance; and when a new primary SIP proxy instance has no standby secondary SIP proxy instance. This is accomplished via the platform infrastructure on which the SIP load balancers, SIP server nodes and SIP proxy instances are built, e.g. the platform infrastructure may have mechanisms for process fault detection and recovery handling and/or notification. In some embodiments, this communication takes place over the sideband communication channels 265. Additionally, the SIP load balancer can also detect the failure of a SIP communication channel to the active SIP proxy instance, for example a fault on communication channel 245 when said channel uses a connection-oriented protocol such as TCP. The SIP load balancer may then start to establish a new SIP communication channel to the corresponding secondary SIP proxy instance after detection of such a failure.

In this way the active secondary SIP proxy instance is limited to handling only those SIP processes that its peer primary SIP proxy instance was responsible for prior to failing. As fault detection is typically very quick, a processing load consisting of new SIP processes that would have been assigned to the active secondary SIP proxy instance is almost immediately redistributed across the remaining active SIP proxy instances in the server cluster after the fault. This has the effect that the active secondary SIP proxy instance is only responsible for handling the completion of calls that were already established on its mate (i.e. the active primary SIP proxy instance) before failure occurred. As these existing calls will be completed over time (following a normal distribution), the extra load for handling these calls experienced by a server node can be absorbed in the overhead maintained by the architecture (typically 20%).

Figure 8:
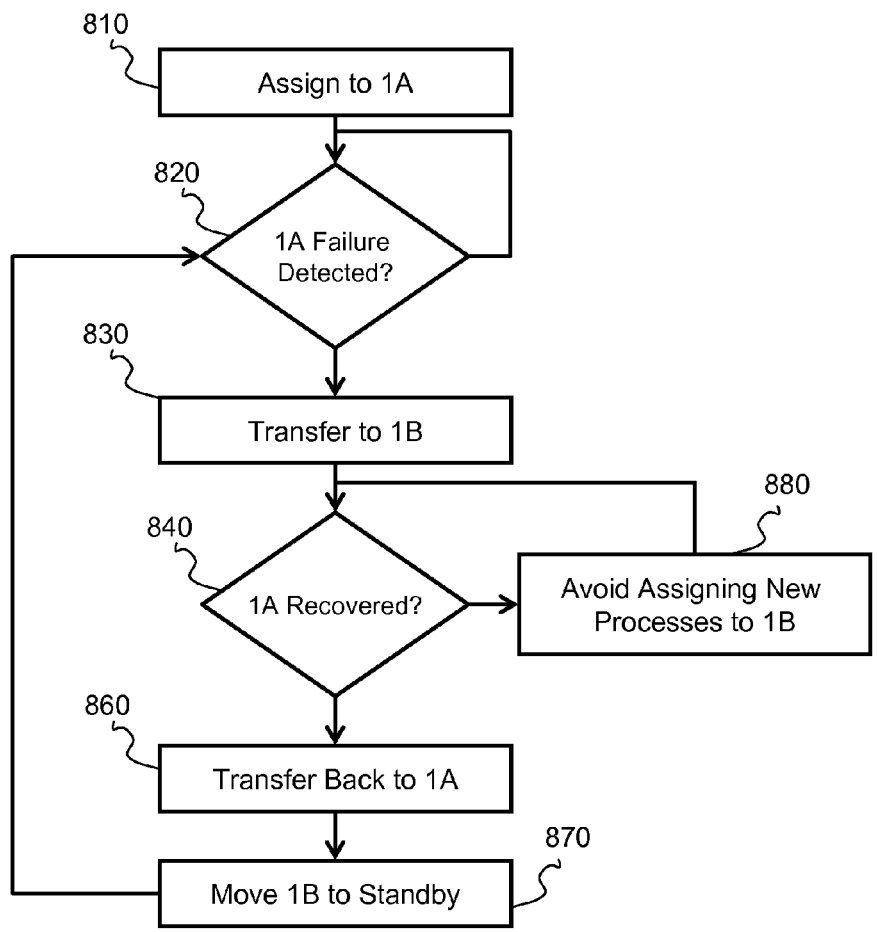
FIG. 8 is a flow diagram illustrating an exemplary method of recovering a failed SIP proxy instance.

FIG. 8 shows a flow diagram illustrating an exemplary method based on the second variation. For ease of explanation, the method is described in relation to a service cluster comprising a primary and secondary SIP proxy instance, however, in practice the method would operate over a plurality of SIP proxy instance pairs. At step 810, a SIP process is assigned to a primary SIP proxy instance (in FIG. 8 referred to as 1A). This may be performed in a similar manner to step 610 of FIG. 6. At step 820, a monitoring procedure acts to detect the failure of a proxy instance. This monitoring procedure may be implemented by one of a SIP load balancer or an individual SIP proxy server node or may be implemented as a distributed process implemented across both the SIP load balancer and the individual proxy server nodes. If no failure is detected, the method performs step 820 again. If a failure of the active primary SIP proxy instance is detected then SIP processes active on the primary SIP proxy instance are activated on the standby secondary SIP proxy instance at step 830. For example, the state data may be replicated between primary and secondary SIP proxy instances on an ongoing basis during normal operation. At step 840, the method waits for the primary SIP proxy instance to be restarted. If the primary SIP proxy instance is not yet recovered, a SIP load balancer avoids assigning new SIP processes to the now active secondary SIP proxy instance at step 880. During recovery, before the primary SIP proxy instance actually reaches a "standby" state, it equalizes call state data with the active secondary SIP proxy instance. The primary SIP proxy instance then becomes a standby primary SIP proxy instance. The active secondary SIP proxy instance updates the standby primary SIP proxy instance so that the two instances are kept in sync. If the active secondary SIP proxy instance fails, the standby primary SIP proxy instance starts processing SIP processes based on the previously synchronized state data. This continues until a switch over to the standby primary SIP proxy instance is instructed, at which point active SIP processes on the active secondary SIP proxy instance are activated on the standby primary SIP proxy instance at step 860. At step 870, the primary SIP proxy instance is set as the active instance and the secondary SIP proxy instance is returned to being a standby instance. New SIP processes may then be assigned to the newly-recovered active primary SIP proxy instance. The monitoring procedure at step 820 can then begin again.

In practice, the second variation enables a processing spike caused by a proxy instance switch-over to be absorbed by the SIP proxy service cluster. Any additional loading stays within the normal resource headroom that is maintained for abnormal network behaviour. There is, for example, no need to further de-rate the capacity for each proxy server node to accommodate the processing spike following switch-over.

One possible load balancing method, and the appropriate adaptations for a SIP load balancer, a SIP server node and a SIP server instance, will now be described. In some embodiments, this arrangement may be implemented without the sideband communication channel and associated operations described with regard to FIGS. 3, 4, 6 and 7, and/or without the arrangement described with regard to FIG. 5.

Typical load balancing methods apply a round-robin mechanism at the SIP load balancer to distribute SIP processes and SIP traffic across the active SIP server instances in a SIP proxy service cluster. Information such as CPU and memory usage data may be exchanged between SIP proxy instances and a SIP load balancer, typically over proprietary communication channels. This information may comprise part of or may complement a "heart-beat" message that indicates the health of the SIP server node, for example whether it is functioning or not functioning.

The present load balancing method enables a SIP processing load to be balanced while minimizing the impact on the performance of the SIP load balancer. To achieve this, each active SIP proxy instance is arranged to generate a load factor value. This load factor value may, for example, be generated by SIP processor 440 as shown in FIG. 4. The load factor value is a single value that is sent to the SIP load balancer to represent a limiting resource usage. While the present method is described using a load factor value for a SIP proxy instance, a variation may use a load factor value for a SIP server node instead.

The load factor value may be derived from resource-use percentages relating to the SIP proxy instance. On a SIP server node implementing a SIP proxy instance, one or more resources may be monitored to produce one or more respective resource-use percentages. For example, one resource may be memory use, e.g. the percentage of available working memory that is used by either the SIP proxy instance or relating to current operations on the SIP server node, and another resource may be CPU usage, e.g. the current or average usage for a particular processor for either the SIP proxy instance or the SIP server node as a complete system (i.e. the global CPU usage of the computing platform of the SIP server node). These resource-use metrics may be available from an operating or control system. In the present case, the highest percentage use of each resource that is being monitored is used to determine a SIP proxy instance's loading. For example, if there are two monitored resources and one was at 50% and the other at 70%, then the load factor value is 70 (i.e.

the highest limiting value is selected). This single load factor value is sent periodically from a SIP proxy instance to the SIP load balancer. For example, it may be sent over sideband communication channel 265 via sideband interface 430 and communications interface 410. The SIP load balancer may then receive the load factor value via communications interface 310 and sideband interface 330. The load factor value may then be passed to load calculator 350, which then informs load assignor 340. The load factor value may be smoothed over a configurable period of time if required. To reduce overhead, the load factor value may also be sent together with the heart-beat message ("piggy-backed") that is already in place for health monitoring.

Figure 9:
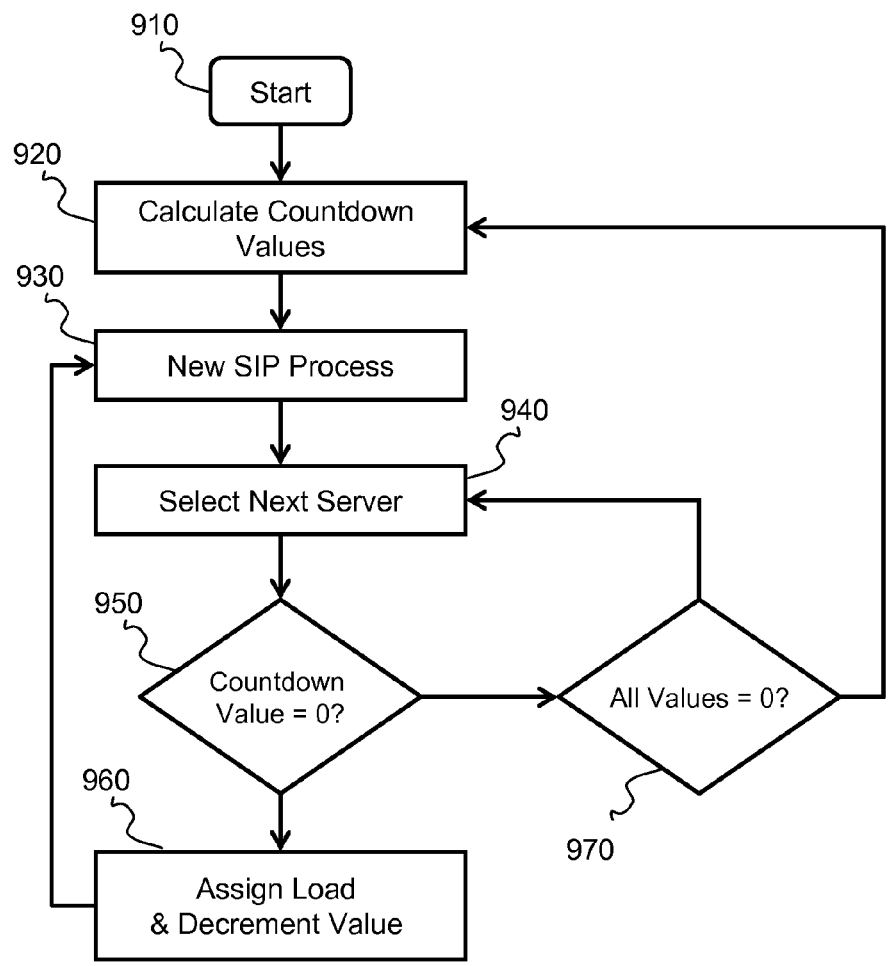
FIG. 9 is a flow diagram illustrating an exemplary method of assigning a SIP process to a SIP proxy instance.

An exemplary method for assigning a processing load comprising one or more SIP processes will now be described with regard to the exemplary method illustrated in FIG. 9. The method may also be implemented on the SIP load balancer of FIG. 3. Considering the SIP load balancer, it is arranged to receive and process a single load factor value from each active SIP proxy instance on a periodic basis as discussed above. At step 910, the SIP proxy service cluster, e.g. 204, is initialized. At step 920, a countdown value is calculated for each active SIP proxy instance. The countdown value is based upon the overall loading of each active SIP proxy instance relative to the other active SIP proxy instances, wherein loading is indicated based on load factor value for each active SIP proxy instance. At initialization it is typically non-zero. At step 930, a new SIP process is identified at the SIP load balancer. For example, a SIP message initiating a transaction or call may be received from a SIP device. At step 940, an active SIP proxy instance is selected. If no SIP proxy servers have been previously selected a first SIP proxy instance, e.g. 532-1, is selected. At step 950, a check is made to see whether the countdown value of the selected SIP proxy instance is zero. If it is not, i.e. is non-zero, the SIP process is assigned to the SIP proxy instance at step 960. After assignment the countdown value is decremented by 1. The method then returns to step 930 to await the next SIP process. If at step 950 the selected proxy instance has a countdown value equal to zero, a check is made to see whether all countdown values are equal to zero at step 970. This may comprise iterating steps 940 and 950 until the iteration count equals the number of active server instances. Alternatively, at step 940 only server instances with a non-zero countdown value may be selected. If all countdown values equal zero then the method proceeds to step 920 wherein new countdown values for all the proxy instances are calculated using the latest load factor values. It will be apparent that variations to the method of FIG. 9 may be made, e.g. to the looping structure and threshold comparisons, while retaining the same overall net effect.

The purpose of the countdown values is to distribute the call traffic fairly across the M available SIP server instances based on their loading. If all of the server instances are equally loaded, the algorithm becomes a round-robin distribution. Only when there is a disparity in loading factor values is one server instance favored over another.

An embodiment of the algorithm for distributing processes fairly and evenly will now be described in more detail. The algorithm for calculating the countdown value is as follows. An unloaded factor value (UF) is calculated as 100 minus the load factor value (LF), e.g. UF=100−LF. The sum of the unloaded factor values (SUF) is calculated, e.g. SUF=UF1+UF2+ . . . +UFM. The countdown value (CV) is calculated as: CV=(M*UFi*100)/SUF, where UFi is the unloaded factor value for the ith server and M equals the number of server nodes (e.g. N+1). The calculation normalizes the unloaded factor values such that for any round M*100 processes are handled. The value 100 is selected here as an example, and other values could equally be used. The load balancer assigns a new process to a server instance that has a non-zero countdown value. The process is assigned and then the countdown value is decremented. When a server instance has a zero countdown value, no more processes are assigned to it until a recalculation occurs. The recalculation occurs when all server instances' countdown values reach zero.

An example of the algorithm will now be described. Assume there are three active server instances: server instance 1 has a load factor of 75, server instance 2 has a load factor of 25, and server instance 3 has a load factor of 47. The unloaded factors would be: 25, 75, and 53, for server instances 1, 2, and 3 respectively. The SUF would be 153 (25+75+53). The calculated countdown values would be: 49 ((3*25*100)/153) for server instance 1; 147 ((3*75*100)/153) for server instance 2; and 104 ((3*53*100)/153) for server instance 3. Processes would be assigned in the order: server instance 1, server instance 2, server instance 3; server instance 1, server instance 2, server instance 3; etc. until the countdown value for server instance 1 reaches zero (i.e. until the order has been repeated 49 times). At that point, new processes would be distributed first to server instance 2, then to server instance 3, and then back to server instance 2. When the countdown value of server instance 3 reaches zero (after another 55 repetitions of the revised order loop: 104-49=55), server instance 2 would be assigned the remainder of the processes until the countdown value for server instance 2 reaches zero (another 43 times: 147-104). At that point, the load factor values would be obtained for the next round and the countdown process would begin again. In some implementations, at higher traffic volumes, recalculations often occur within 100-200 milliseconds. The countdown value calculation time is insignificant in the scheme of the overall algorithm because it is only performed every M*100 processes. If at any point in time a server instance goes out of service, the load balancer is automatically notified and the load balancer immediately marks the server instance to not receive any new processes. The remaining server instances are assigned new processes as long as their countdown values are non-zero. If at any point in time a new server instance comes into service and has an active standby server instance, then new processes are not assigned until the next recalculation occurs. Since typically this is a small fraction of a second, this latency has little impact.

The examples described above effectively distribute SIP traffic to each proxy instance in a round-robin fashion as long as each server has a non-zero countdown value. The algorithm approaches the round-robin approach when the servers are equally loaded but favors distribution to the least loaded servers when the loading is not equal. Adaptations to the algorithm and/or alternative algorithms that provide the same effect are also envisaged.

Another advantage of a load factor value is that it may be used to determine overall cluster utilization. Overall cluster utilization may be calculated as a function of the load factor values of the individual proxy instances. For example, given that the load balancing algorithm described above maintains equal loading among the active SIP proxy instances, the highest load factor value from the group of load factor values for the cluster may be used to approximate the overall load of the cluster. Alternatively, an average load factor value or other statistical metric across the active SIP proxy instances in the cluster may be used. The SIP load balancer is then able to use an overall cluster utilization in a similar manner to the individual server operation capacities described above, e.g. the overall cluster utilization may be compared against configurable thresholds to determine when to discard or redirect SIP traffic entering the SIP proxy service cluster. For example, inbound INVITE transactions can be discarded by the SIP load balancer if the overall cluster utilization is above a configurable threshold to avoid overloading the proxy cluster.

In certain implementations the load factor value may be based upon server CPU and memory resources. In symmetrical multiprocessor (SMP) servers overall CPU usage may not be informative enough to optimally control load balancing. For example, if a thread directly involved in processing SIP messages consumes 100% of CPU resources of a single core on an 8-core SMP server, the overall CPU usage may be only 12.5%, assuming the other cores are idle. If the load factor value was calculated based on the 12.5% usage value it would not take into account that actually the multicore CPU was busy. In this case the overall CPU use is low but the server instance or server node cannot handle any more SIP traffic since a single thread on one core becomes a processing bottleneck. To address this problem in the present example, threads that are critical to the operation of SIP processing may be marked as "critical threads". The CPU usage of these so-called "critical threads" then forms part of the group of resource usage metrics on which to base the load factor value. For example, if the load factor value is initially based on overall CPU usage and memory usage then CPU usage of a "critical thread" may be added to this group. If memory usage is 50% in the above example, without the "critical thread" adaptation the load factor value is 50 (50 is the highest value from 50% and 12.5%), and with the "critical thread" adaptation the load factor value is 100 (100 is the highest value from 100%, 50% and 12.5%). In this way the problems with multicore processors can be avoided and an appropriate load factor value can be provided to the load balancer so it can distribute traffic to other servers and avoid a potential overload condition.

The above embodiments are to be understood as illustrative examples of the invention. Further embodiments of the invention are envisaged. For example, many of these are describe above. Additionally SIP entities other than the SIP load balancer may make use of the mechanisms described herein to update state or routing information relating to SIP processes. In this description the terms SIP server node and SIP server instance have been used to respectively refer to hardware and software aspects on a computing device; it is to be understood that described functions of the SIP server instance may be implemented in hardware, and as such may be performed by a SIP server node. Any functions of the SIP server node and/or SIP server instance may also be performed by a general SIP server device. A SIP server node may also comprise operating and control software required for implementation of a SIP server instance. The SIP server instance may be considered part of the operating software of the SIP server node, being responsible for controlling network devices. Reference to state data returned by a SIP server instance, typically refers to state data returned by an active SIP server instance, e.g. a SIP server instance that is actively processing calls. However, if required the methods could also be used to query standby SIP server instances. References to "active" processing refer to, for example, processing of a current SIP process, such as a transaction, dialog or call. The processing need not be continuous; it will likely take place as SIP messages relating to the SIP process are received by a SIP server instance, e.g. as two or more parties exchanging signaling messages during a VoIP call.

It is to be understood that any feature described in relation to any one embodiment or variation may be used alone, or in combination with other features described, and may also be used in combination with one or more features of any other of the embodiments or variations, or any combination of any other of the embodiments or variations. Generally, the described features may be combined in any combination unless otherwise stated. Furthermore, equivalents and modifications not described above may also be employed without departing from the scope of the invention, which is defined in the accompanying claims.

What is claimed is:

1. A system for balancing a SIP processing load, comprising:
    a memory and a processor;
    a load balancer in communication with the processor; and
    a plurality of server nodes, including:
        a first SIP server instance stored in the memory, the first SIP server instance arranged to handle one or more SIP processes during normal operation as an active server instance, and
        a second SIP server instance stored in the memory, the second SIP server instance arranged to act as a standby server instance during normal operation, the second SIP server instance being further arranged to take over the handling of said one or more SIP processes as an active server instance responsive to failure of the first SIP server instance,
    wherein the load balancer is arranged to assign a SIP process to an active SIP server instance,
    wherein, responsive to a second SIP server instance taking over the handling of one of more SIP processes previously handled by a first SIP server instance, the load balancer is arranged to assign new SIP processes to a group of active SIP server instances that excludes said second SIP server instance,
    wherein at least one active SIP server instance of the group of active SIP server instances that excludes said second SIP server instance is configured to provide a load factor value representative of a current resource usage associated with the active SIP server instance, and
    wherein the load balancer comprises:
        an interface for receiving said load factor value from said one active SIP server instance of the group of active SIP server instances;
        a loading calculator to determine a countdown value for the group of active SIP server instances based on the load factor value; and
        a load assigner for selecting a SIP server instance of the group of active SIP server instances and assigning a SIP process to the selected SIP server instance if said countdown value is above a predetermined threshold, the countdown value for the selected SIP server instance being decremented after the SIP process is assigned.

2. The system of claim 1, wherein the system has a desired system capacity and wherein each server node has an absolute server capacity within which the server node can maintain normal operation, and wherein a number of the plurality of server nodes is calculated as:

$$M = (\text{desired system capacity}/\text{absolute server capacity}) + 1.$$

3. The system of claim 1, wherein the load balancer is arranged to control whether a SIP process is assigned to a SIP server instance based on an operational capacity, the operational capacity based on:
    desired system capacity * (1 /a number of server nodes), wherein a SIP process is not assigned to a SIP server instance if assignment of the SIP process would cause a number of operations to exceed the operational capacity.

4. The system of claim 1, wherein responsive to a recovery of the first SIP server instance after a failure, the first SIP server instance is arranged to take over the handling of one of more SIP processes from the second SIP server instance after recovery of the first SIP server instance.

5. The system of claim 1, wherein the first SIP server instance is implemented on a first server node and the second SIP server instance is implemented on a second server node.

6. The system of claim 1, wherein at least one of the first SIP server instance and second SIP server instance comprises:
- a first interface for receiving one or more SIP messages from a communicating device;
- a processing component arranged to handle said received messages as part of a SIP process; and
- a second interface for sending state data for a set SIP processes to a load balancer, the state data indicating a state of said SIP processes on said SIP server instance.

7. The system of claim 1, wherein the load balancer further comprises:
- a data structure for mapping one or more SIP processes to at least one of the group of active SIP server instances;
- an interface for receiving state data for a set of SIP processes from at least one of the group of active SIP server instances, the state data indicating one or more states of said SIP processes on the at least one of the group of active SIP server instances; and
- an update manager for updating the data structure based on received state data, the update manager being arranged to use said state data to remove SIP processes from the data structure that have an inactive state.

8. A system for balancing a SIP processing load, comprising:
- a memory and a processor;
- a SIP server instance stored in the memory, the SIP server instance arranged to handle one or more SIP processes, said SIP server instance further arranged to provide a single load factor value representative of a current resource usage associated with the SIP server instance; and
- a load balancer in communication with the processor, the load balancer comprising:
  - an interface for receiving said load factor value from said SIP server instance,
  - a loading calculator to determine a first countdown value for the SIP server instance based on the load factor value, the first countdown value being decremented after a new SIP process is assigned to the SIP server instance, and
  - a load assigner for assigning a SIP process to the SIP server instance according to a round-robin scheme if said first countdown value is above a predetermined threshold.

9. The system of claim 8, wherein the loading calculator is arranged to determine a second countdown value for the SIP server instance responsive to the first countdown value being below and/or equal to the predetermined threshold and countdown values for one or more SIP server instances managed by the load balancer being below and/or equal to the predetermined threshold.

10. The system of claim 8, wherein the load balancer is arranged to use one or more load factor values to determine whether to accept new SIP processes for assignment.

11. The system of claim 8, wherein the SIP server instance comprises:
- a first interface for receiving one or more SIP messages from a communicating device;
- a processing component arranged to handle said received messages as part of a SIP process; and
- a second interface for sending state data for a set of SIP processes to a load balancer, the state data indicating a state of said SIP processes on said SIP server instance.

12. The system of claim 8, wherein the load balancer comprises:
- a data structure for mapping one or more SIP processes to the SIP server instance;
- an interface for receiving state data for a set of SIP processes from the SIP server instance, the state data indicating one or more states of SIP processes being processed by the SIP server instance; and
- an update manager for updating the data structure based on received state data, the update manager being arranged to use said state data to remove SIP processes from the data structure that have an inactive state.

13. The system of claim 8, wherein the SIP server instance comprises a first SIP proxy instance running on a server node, wherein the system further comprises:
- a second SIP proxy instance arranged to act as a standby SIP proxy instance during normal operation, the second SIP proxy instance being arranged to take over the handling of said one or more SIP processes responsive to failure of the first SIP proxy instance,
- wherein the load balancer is arranged to, responsive to the second SIP proxy instance taking over the handling of one of more SIP processes previously handled by the first SIP proxy instance, assign new SIP processes to a group of SIP proxy instances that excludes said second SIP proxy instance.

14. A method for balancing a processing load, comprising:
assigning a SIP process to an active first SIP proxy server instance by:
- providing a load factor value from the active first SIP proxy server instance to a load balancer, the load factor value being representative of a current resource usage associated with the active first SIP proxy server instance;
- determining, at the load balancer, a countdown value for the active first SIP proxy server instance based on the load factor value;
- assigning the SIP process to the active first SIP proxy server instance if the countdown value is above a predetermined threshold;
- decrementing the countdown value;
in response to failure of the active first SIP proxy server instance, transferring processing of said assigned SIP process to a standby second SIP proxy server instance, said second SIP proxy server instance becoming an active second SIP proxy server instance following said transfer of processing;
recovering the failed first SIP proxy server instance, said first SIP proxy server instance becoming a standby first SIP proxy server instance on recovery, SIP processes on the active second SIP proxy instance being synchronized to the standby first SIP proxy server instance; and
after a configurable time period has elapsed, activating SIP processes on the standby first SIP proxy server instance, such that the first SIP proxy server instance becomes the active first SIP proxy server instance and the second SIP proxy server instance becomes the standby second SIP proxy server instance.

15. The method of claim 14, further comprising assigning new SIP processes to a group of active SIP proxy server instances that excludes said active second SIP proxy server instance.

16. The method of claim 14 wherein, if the active second SIP proxy server instance fails, activating SIP processes on the standby first SIP proxy server instance.

* * * * *